United States Patent [19]

Considine

[11] Patent Number: 5,522,612
[45] Date of Patent: Jun. 4, 1996

[54] VARIABLE SPEED DRIVE SHAFT BICYCLE

[76] Inventor: Daniel B. Considine, 6208 Wiggins Rd., Naylor, Ga. 31641

[21] Appl. No.: 384,117

[22] Filed: Feb. 6, 1995

[51] Int. Cl.⁶ .................................................... B62M 1/02
[52] U.S. Cl. .......................................... 280/260; 280/238
[58] Field of Search ................................ 280/210, 236, 280/238, 259, 260

[56] References Cited

U.S. PATENT DOCUMENTS

| | | | |
|---|---|---|---|
| 2,578,634 | 6/1945 | Hussey | 280/260 |
| 4,585,244 | 4/1986 | Testa, Sr. et al. | 280/260 |
| 4,613,010 | 9/1986 | Enocson | 280/260 |
| 4,831,889 | 5/1989 | Howard | 280/260 X |
| 5,078,416 | 1/1992 | Keyes | 280/260 |
| 5,316,327 | 5/1994 | Bell | 280/260 |

FOREIGN PATENT DOCUMENTS 9744 of 1900 United Kingdom ................... 280/260

*Primary Examiner*—Kevin T. Hurley

[57] ABSTRACT

A bicycle for converting reciprocal human motion into linear vehicular translation. The inventive device includes a frame supported relative to a ground surface by front and rear wheels. A pedal assembly converts user pedaling into rotational torque output through a pedal shaft extending vertically through the frame. A first transmission receives torque from the pedal shaft and couples with a drive shaft extending through the frame. A second transmission couples the drive shaft to the rear wheel such that the vehicle can be accelerated by an individual.

1 Claim, 5 Drawing Sheets

VARIABLE SPEED DRIVE SHAFT BICYCLE

BACKGROUND OF THE INVENTION

1. Field of the Invention

The present invention relates to bicycle structures and more particularly pertains to an variable speed drive shaft bicycle for converting reciprocal human motion into linear vehicular translation.

2. Description of the Prior Art

The use of bicycle structures is known in the prior art. More specifically, bicycle structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle structures include U.S. Pat. Nos. 4,831,889; 5,228,354; 5,078,416; 5,116,070; and 3,910,126.

While these devices fulfill their respective, particular objectives and requirements, the aforementioned patents do not disclose a variable speed drive shaft bicycle for converting reciprocal human motion into linear vehicular translation which includes a frame supported relative to a ground surface by front and rear wheels, a pedal assembly for converting user pedalling into rotational torque output through a pedal shaft, a first transmission coupling the pedal shaft with a drive shaft, and a second transmission coupling the drive shaft to the rear wheel.

In these respects, the variable speed drive shaft bicycle according to the present invention substantially departs from the conventional concepts and designs of the prior art, and in so doing provides an apparatus primarily developed for the purpose of converting reciprocal human motion in linear vehicular translation.

SUMMARY OF THE INVENTION

In view of the foregoing disadvantages inherent in the known types of bicycle structures now present in the prior art, the present invention provides a new variable speed drive shaft bicycle construction wherein the same can be utilized for providing human powered translation across a ground surface. As such, the general purpose of the present invention, which will be described subsequently in greater detail, is to provide a new variable speed drive shaft bicycle apparatus and method which has many of the advantages of the bicycle structures mentioned heretofore and many novel features that result in a variable speed drive shaft bicycle which is not anticipated, rendered obvious, suggested, or even implied by any of the prior art bicycle structures, either alone or in any combination thereof.

To attain this, the present invention generally comprises a bicycle for converting reciprocal human motion into linear vehicular translation. The inventive device includes a frame supported relative to a ground surface by front and rear wheels. A pedal assembly converts user pedaling into rotational torque output through a pedal shaft extending vertically through the frame. A first transmission receives torque from the pedal shaft and couples with a drive shaft extending through the frame. A second transmission couples the drive shaft to the rear wheel such that the vehicle can be accelerated by an individual.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new variable speed drive shaft bicycle apparatus and method which has many of the advantages of the bicycle structures mentioned heretofore and many novel features that result in a variable speed drive shaft bicycle which is not anticipated, rendered obvious, suggested, or even implied by any of the prior art bicycle structures, either alone or in any combination thereof.

It is another object of the present invention to provide a new variable speed drive shaft bicycle which may be easily and efficiently manufactured and marketed.

It is a further object of the present invention to provide a new variable speed drive shaft bicycle which is of a durable and reliable construction.

An even further object of the present invention is to provide a new variable speed drive shaft bicycle which is susceptible of a low cost of manufacture with regard to both materials and labor, and which accordingly is then susceptible of low prices of sale to the consuming public, thereby making such variable speed drive shaft bicycles economically available to the buying public.

Still yet another object of the present invention is to provide a new variable speed drive shaft bicycle which provides in the apparatuses and methods of the prior art some of the advantages thereof, while simultaneously overcoming some of the disadvantages normally associated therewith.

Still another object of the present invention is to provide a new variable speed drive shaft bicycle for converting reciprocal human motion into linear vehicular translation.

Yet another object of the present invention is to provide a new variable speed drive shaft bicycle which includes a frame supported relative to a ground surface by front and rear wheels, a pedal assembly for converting user pedalling into rotational torque output through a pedal shaft, a first transmission coupling the pedal shaft with a drive shaft, and a second transmission coupling the drive shaft to the rear wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
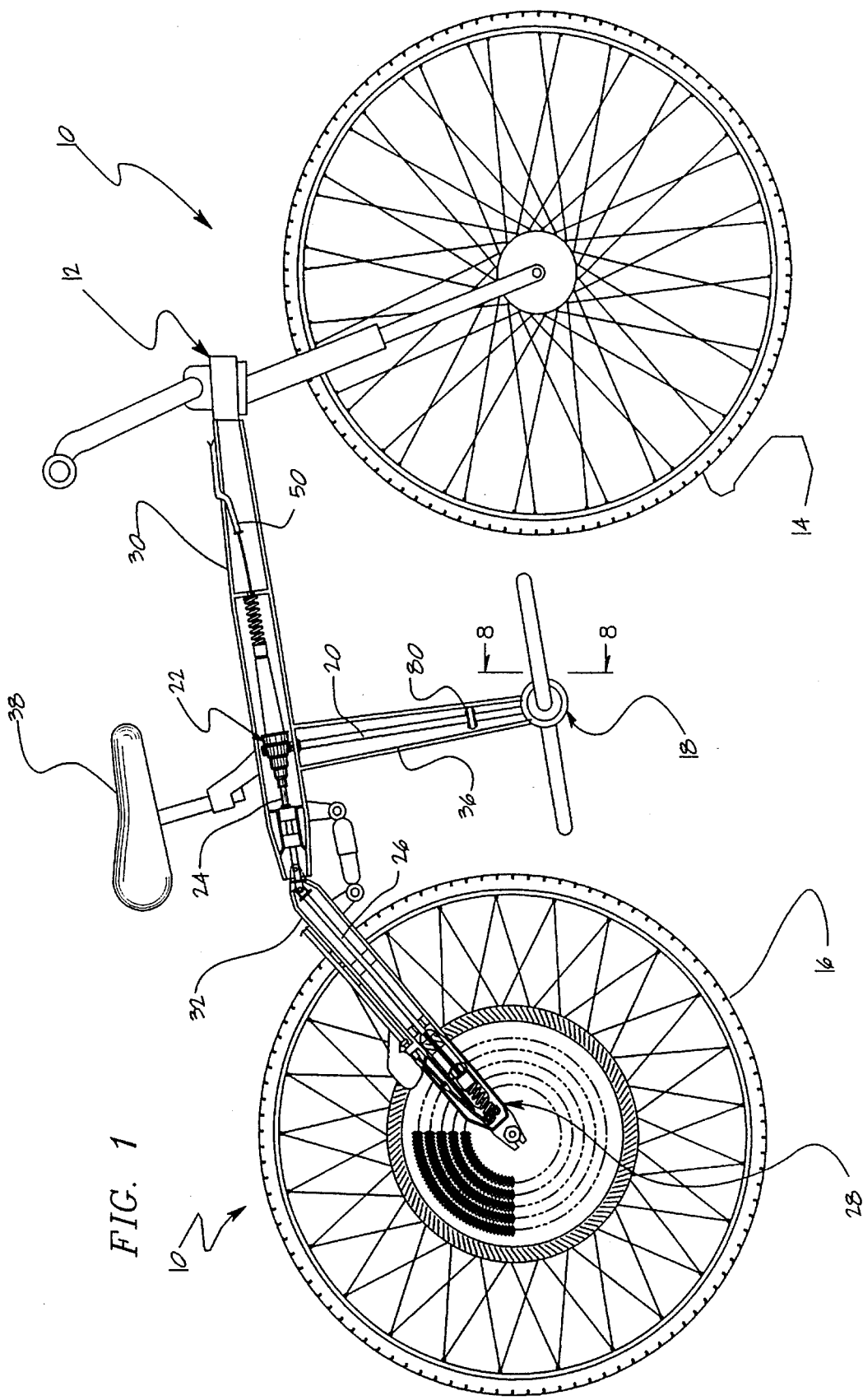
FIG. 1 is a side elevation view, partially in cross section, of a variable speed drive shaft bicycle according to the present invention.

With reference now to the drawings, and in particular to FIGS. 1–9 thereof, a new variable speed drive shaft bicycle embodying the principles and concepts of the present invention and generally designated by the reference numeral 10 will be described.

More specifically, it will be noted that the variable speed drive shaft bicycle 10 comprises a frame means 12 including a front wheel 14 and a rear wheel 16 for movably supporting an individual relative to an unillustrated ground surface. A pedal means 18 including a pedal shaft 20 is mounted to the frame means 12 for converting reciprocal human motion into rotational torque outputted through the pedal shaft. A first transmission means 22 is mounted within the frame means 12 and operates for transmitting rotational torque from the pedal shaft 20 to an output shaft 24. The output shaft 24 is coupled to and rotates a drive shaft 26 extending through the frame means 12. A second transmission means 28 receives torque from the drive shaft 26 and operates for transmitting rotational torque from the drive shaft to the rear wheel 16 of the bicycle 10. By this structure, reciprocal human motion is converted into linear translation of the bicycle 10 over an unillustrated ground surface.

Figure 4:
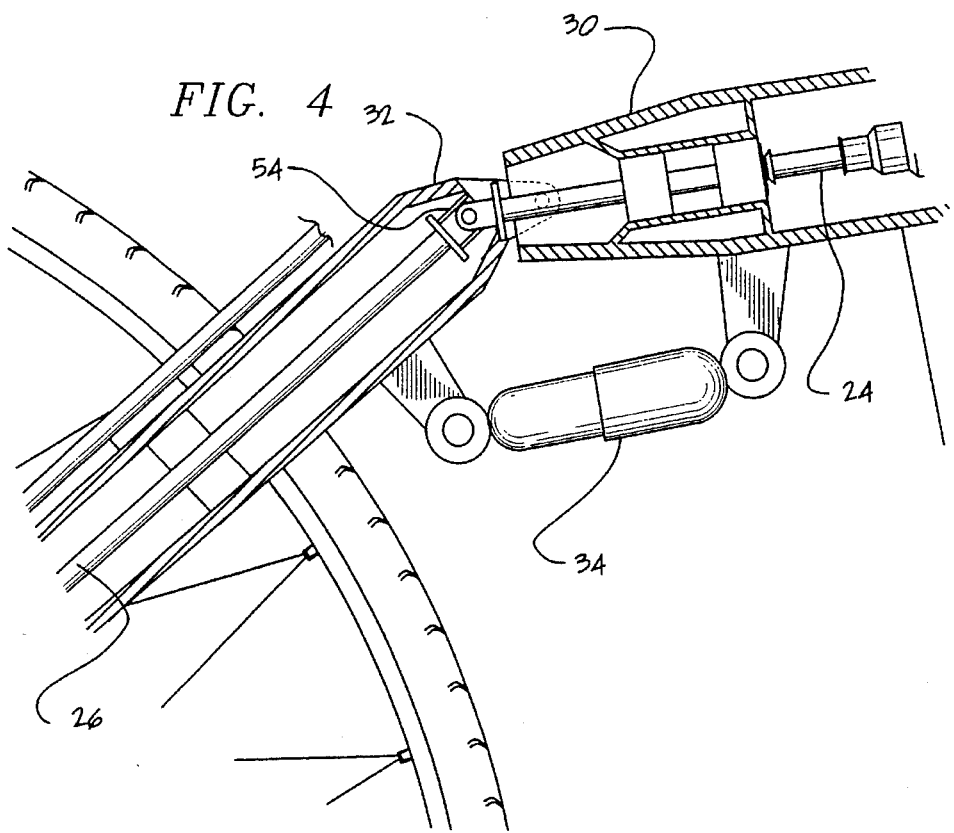
FIG. 4 is a cross sectional view of a portion of the present invention.

As best illustrated in FIG. 1, it can be shown that the frame means 12 according to the present invention 10 comprises an upper frame tube 30 having a forward end to which the front wheel 14 is rotatably and pivotally mounted. A pivoting frame tube 32 is pivotally mounted to a rearward end of the upper frame tube 30 and extends away therefrom to couple with the rear wheel 16. As shown in FIG. 4, a dampened spring 34 is mounted between the upper frame tube 30 and the pivoting frame tube 32 and operates to permit resilient articulation of the pivoting frame tube relative to a remainder of the frame means 12. A depending center frame tube 36 extends downwardly from the upper frame tube into a position substantially centered between the front wheel 14 and the rear wheel 16. The pedal means 18 is mounted at a lower distal end of the depending center frame tube 36, whereby an individual sitting upon a seat 38 of the frame means 12 can engage and operate the pedal means.

Figure 2:
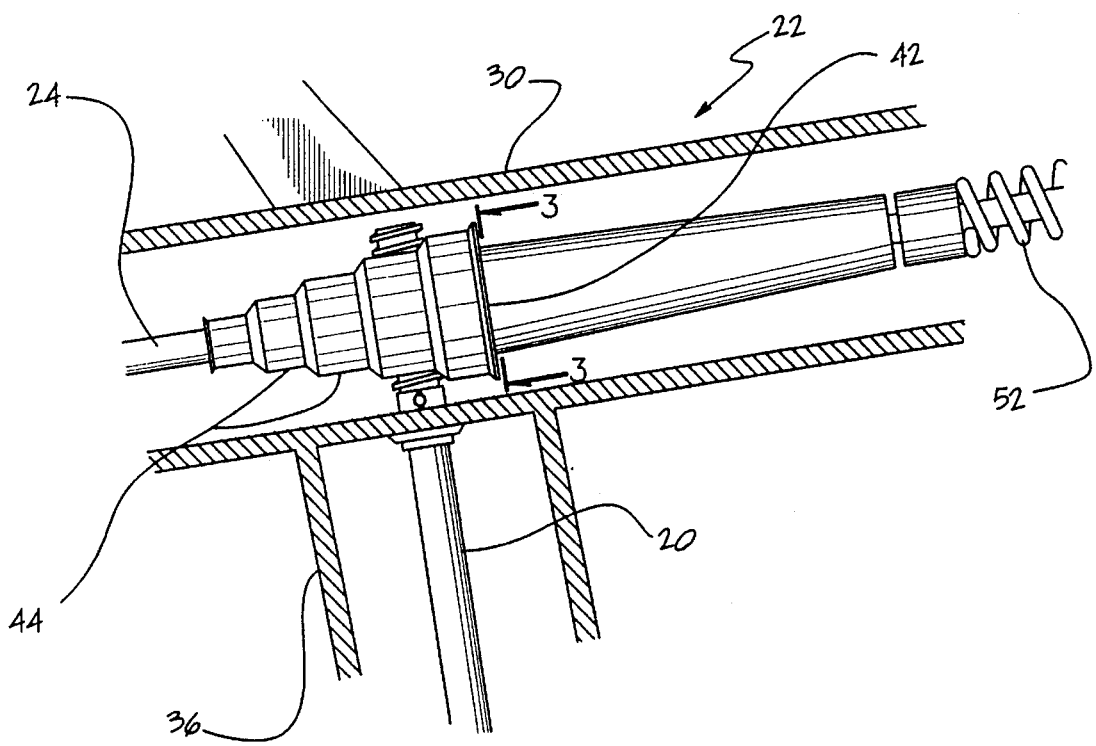
FIG. 2 is a cross sectional view of a first transmission means comprising a portion of the present invention.
Figure 3:
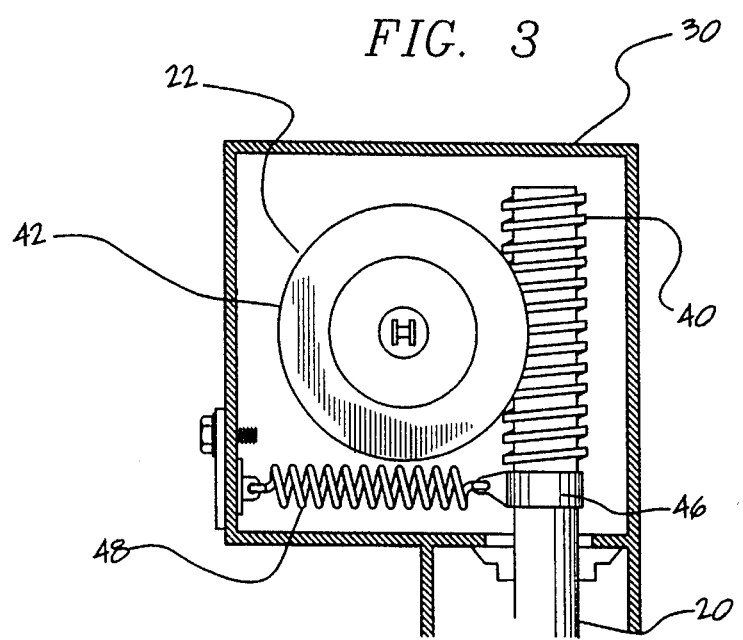
FIG. 3 is a cross sectional view taken along line 3—3 of FIG. 2.

As shown in FIGS. 2 and 3, the pedal shaft 20 of the pedal means 18 extends through an interior of the depending center frame tube 36 and into a portion of the upper frame tube 30. The pedal shaft 20 terminates within the upper frame tube 30 in a worm gear 40. A stepped conical gear 42 is mounted to the output shaft 24 and positioned in mesh with the worm gear 40, whereby a rotation of the pedal shaft 20 will effect rotation of the stepped conical gear 42 and the output shaft 24 to which it is attached. As shown in FIG. 2 the stepped conical gear 42 is provided with a plurality of gear cylinders 44 of disparate diameters, each of which can be individually engaged to the worm gear 40 to provide a desired rotational output speed ratio between the pedal shaft 20 and the output shaft 24. To this end, the stepped conical gear 42 is movably mounted along the output shaft 24 so as to be axially displacable relative thereto. To this end, the output shaft 24 may include exterior splines engaging interior splines within the stepped conical gear 42, or other equivalent structure permitting such axial translation of the stepped conical gear relative to the output shaft 24. To insure engagement of the worm gear 40 with any one of the gear cylinders 44 of the stepped conical gear 42, the pedal shaft 20 is resiliently biased into engagement therewith. To this end, a collar 46 rotatably mounted about the pedal shaft 20 is coupled to a spring 48. The spring 48, in turn, is coupled to an interior surface of the upper frame tube 30 so as to pull the worm gear 40 into mesh with the stepped conical gear 42. Thus, an axial movement of the stepped conical gear 42 can be accomplished to position the worm gear 40 in mesh with any one of the gear cylinders 44 to effect selection of a desired gear ratio of the first transmission means 22.

To effect selective movement of the stepped conical gear 42 relative to the worm gear 40, a first shift cable 50 is rotatably coupled to the stepped conical gear 42 and can be tensioned to effect movement thereof. A first return spring 52, as shown in FIG. 2 biases the conical gear 42 against a force of the cable 50 to effect return of the conical gear 42 upon a relaxing of the first shift cable 50. By this structure, any one of a plurality of speed ratios can be selected.

As shown in FIG. 4, the output shaft 24 extends out the rearward end of the upper frame tube 30 and is coupled to the drive shaft 26 by a universal joint 54. The universal joint 54 permits articulation of the pivoting frame tube 32 relative to the upper frame tube 30 during traversing of the bicycle 10 over rough or uneven terrain. The hollow drive shaft 26 extends through the pivoting frame tube 32 to couple with the second transmission means 28.

Figure 5:
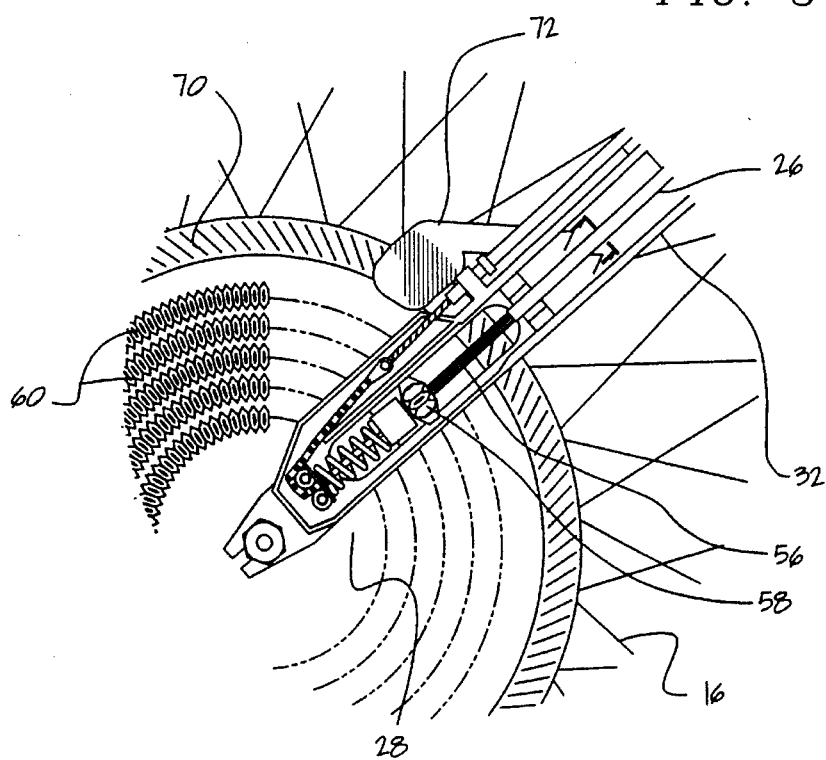
FIG. 5 is a cross sectional view of a second transmission means comprising a portion of the present invention.
Figure 6:
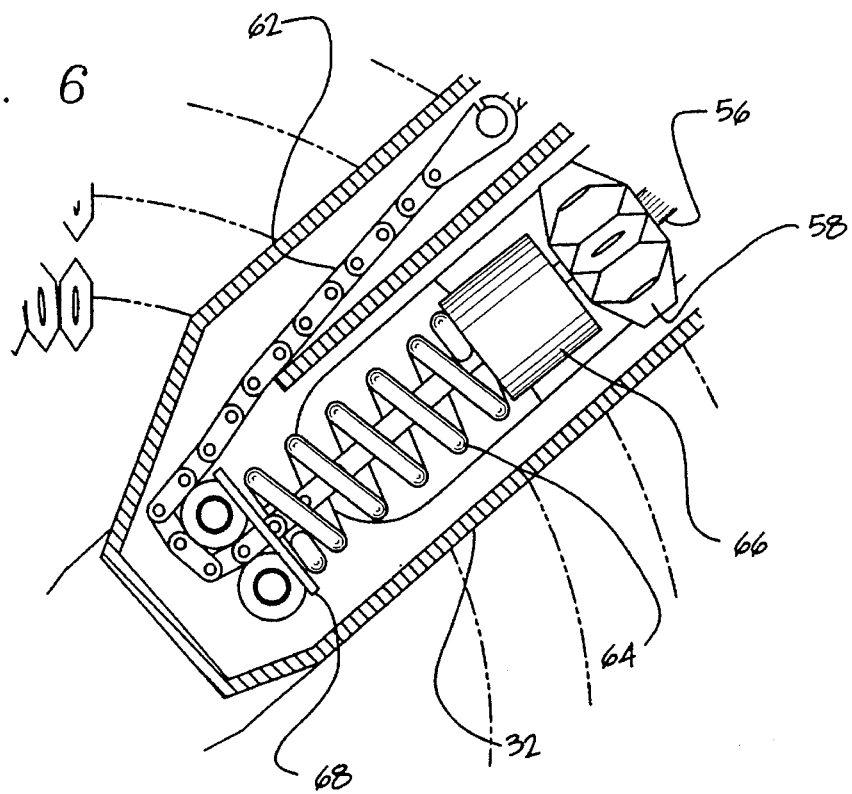
FIG. 6 is an enlarged cross sectional illustration of the second transmission means.
Figure 7:
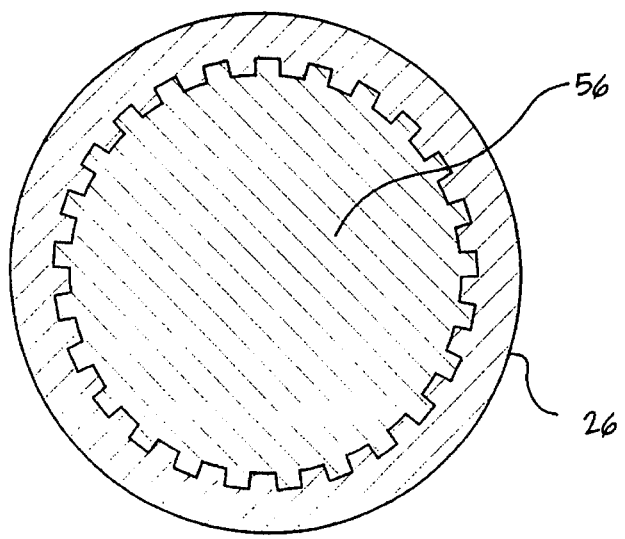
FIG. 7 is a cross sectional view taken along line 7—7 of FIG. 5.

As shown in FIGS. 5 through 7, the second transmission means 28 according to the present invention 10 preferably comprises a splined shaft 56 slidably received within the hollow drive shaft 26. A spur gear 58 is mounted to the spline shaft 56 and projects through an unlabeled elongated aperture in the pivoting frame tube 32. A plurality of ring gears 60 are secured to the rear wheel 16 and concentrically positioned about an unlabeled axle extending through the rear wheel. The spur gear 58 is positioned in mesh with one of the ring gears 60 and can be selectively positioned into mesh with other ring gears as desired. To this end, and as most clearly illustrated in FIG. 6, a second shift cable 62 is rotatably coupled to the spur gear 58 and can be tensioned to effect extensioning of the spline shaft 56 from the hollow drive shaft 26. A second return spring 64 is interposed between a spring bearing 66 and an abutment plate 68 within the pivoting frame tube 32 and operates to bias the spur gear 58 against a force of the tensioned cable 62. By this structure, the spur gear 58 can be positioned into mesh with a desired one of the ring gears 60 to provide for a particular speed ratio between the hollow drive shaft 26 and the rear wheel 16 as desired.

As shown in FIG. 5, a brake disc 70 is preferably concentrically positioned proximal to the ring gear 60 and coupled to the rear wheel 16. A brake caliper 72 mounted to the pivoting frame tube 32 and actuated by unillustrated cable structure can be selectively utilized to effect deceleration of the bicycle 10 as desired.

Figure 8:
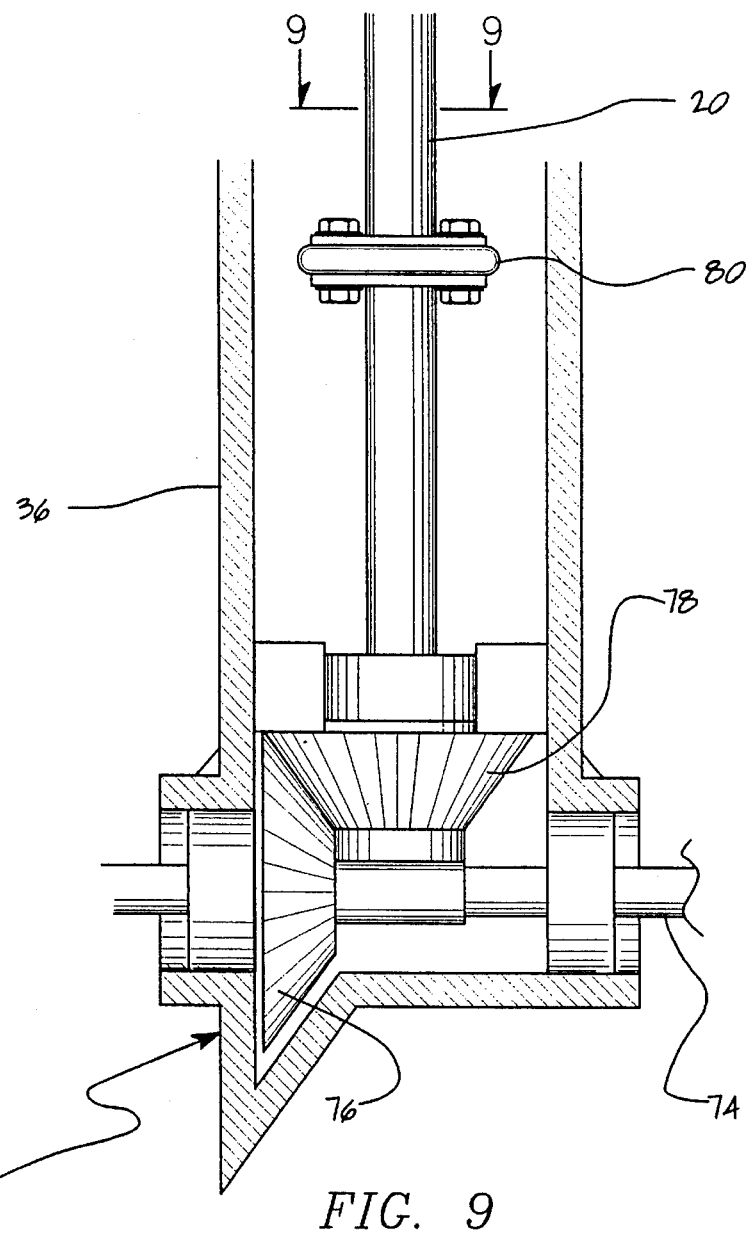
FIG. 8 is a cross sectional view taken along line 8—8 of FIG. 1.
Figure 9:
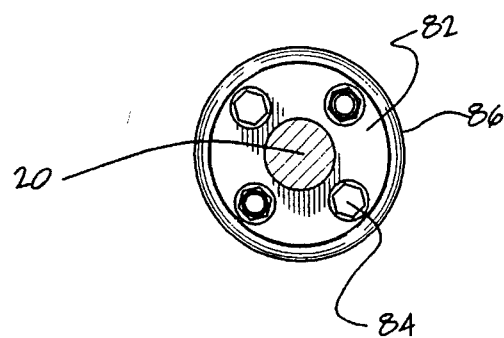
FIG. 9 is a cross sectional view taken along line 9—9 of FIG. 8.

Referring now to FIGS. 8 and 9, it can be shown that the pedal means 18 according to the present invention 10 comprises a crank 74 rotatably mounted to a lower end of the depending center frame tube 36. A crank bevel gear 76 secured to the crank 74 is positioned in mesh with a pedal shaft bevel gear 78 which communicates with the pedal shaft 20 through a resilient coupling 80. The resilient coupling 80 permits movement of the pedal shaft 20 as described above for the first transmission means 22. As shown in FIG. 9, the resilient coupling 80 comprises a pair of spaced flanges 82 coupled together by a plurality of fasteners 84. An elastomeric spacer 86 interposed between the flanges 82 permits slight articulation of the pedal shaft 20 relative to the pedal shaft bevel gear 78 to which it transfers torque from.

In use, the variable speed drive shaft bicycle 10 according to the present invention can be easily utilized to convert reciprocal human motion into linear vehicular translation. The bicycle 10 provides many benefits over conventionally known bicycles utilizing chain driven transmissions and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A variable speed drive shaft bicycle comprising:

a frame means including a front wheel and a rear wheel for movably supporting an individual relative to a ground surface, the frame means having an upper frame tube with a forward end to which the front wheel being rotatably and pivotally mounted; a pivoting frame tube pivotally mounted to a rearward end of the upper frame tube and extending away therefrom to couple with the rear wheel; a dampened spring means mounted between the upper frame tube and the pivoting frame tube for permitting resilient articulation of the pivoting frame tube relative to a remainder of the frame means;

a pedal means including a pedal shaft rotatably mounted to the frame means for converting reciprocal human motion into rotational torque outputted through the pedal shaft, the pedal shaft of the pedal extends through an interior of a depending center frame tube and into a portion of the upper frame tube, the pedal means having a crank rotatably mounted to a lower end of the depending center frame tube, the crank having a crank bevel gear secured thereto, the pedal shaft having a pedal shaft bevel gear secured thereto and positioned in mesh with the crank bevel gear;

the pedal shaft includes a resilient coupling permitting articulation of the pedal shaft, the resilient coupling comprising a pair of spaced flanges interposed between portions of the pedal shaft and being coupled together by a plurality of fasteners, with an elastomeric spacer interposed between the flanges;

the depending center frame tube extending downwardly from the upper frame tube into a position substantially centered between the front wheel and the rear wheel, wherein the pedal means is mounted to a lower distal end of the depending center frame tube;

an output shaft rotatably mounted to the frame means;

a first transmission means mounted to the frame means for transmitting rotational torque from the pedal shaft to the output shaft, the first transmission means comprises a worm gear coupled to an end of the pedal shaft, a stepped conical gear mounted to the output shaft and positioned in mesh with the worm gear, whereby a rotation of the pedal shaft will effect rotation of the stepped conical gear and the output shaft to which it is attached;

the stepped conical gear is shaped so as to define a plurality of gear cylinders of disparate diameters, each of which can be individually engaged to the worm gear to provide a desired rotational output speed ratio between the pedal shaft and the output shaft, the stepped conical gear is movably mounted along the output shaft so as to be axially displacable relative thereto, the pedal shaft is resiliently biased into engagement with the stepped conical gear;

a drive shaft articulately coupled to the output shaft and being substantially hollow;

a second transmission means coupled to the drive shaft for transmitting rotational torque from the drive shaft to rear wheel of the frame means, the second transmission means comprises a splined shaft slidably received within the hollow drive shaft; a spur gear mounted to the splined shaft and projecting through elongated aperture in the pivoting frame tube; a plurality of ring gears secured to the rear wheel, the spur gear being positioned in mesh with one of the ring gears, the spur gear being selectively positionable into mesh with any of the ring gears; and a brake disc concentrically positioned proximal to the ring gears and coupled to the rear wheel, and a brake caliper mounted to the pivoting frame tube which can be selectively utilized to engage the brake disc to effect deceleration of the bicycle.

\* \* \* \* \*